(No Model.)

W. SLEICHER, Jr.
NUT LOCK.

No. 388,508. Patented Aug. 28, 1888.

Witnesses:
Frank C. Curtis
N. Davenport.

Inventor:
William Sleicher Jr.
by Geo. A. Mosher
Atty.

UNITED STATES PATENT OFFICE.

WILLIAM SLEICHER, JR., OF TROY, NEW YORK.

NUT-LOCK.

SPECIFICATION forming part of Letters Patent No. 388,508, dated August 28, 1888.

Application filed May 7, 1888. Serial No. 273,083. (No model.)

*To all whom it may concern:*

Be it known that I, WILLIAM SLEICHER, Jr., a resident of the city of Troy, in the county of Rensselaer and State of New York, have invented certain new and useful Improvements in Nut-Locks; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

My invention relates to improvements in nut-locks; and it consists of the novel construction and combination of parts, hereinafter described, and pointed out in the claims.

Figure 1:
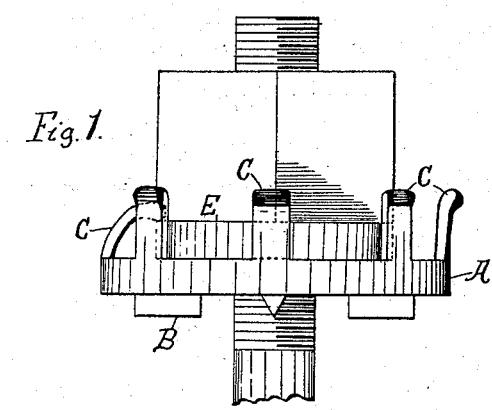
Figure 2:
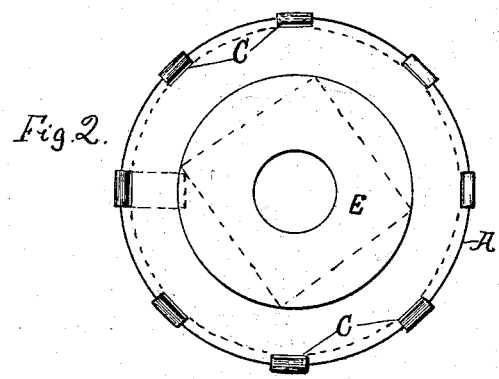
Figure 3:
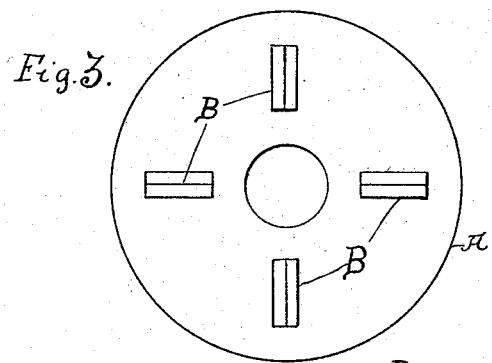

Figure 1 of the drawings is a view in side elevation of a nut locked upon a bolt by my improved device. Fig. 2 is a top plan view of the device detached. Fig. 3 is a bottom plan view of the same device detached.

My improved device consists of a washer, A, provided on one side with projecting spurs or lugs B, adapted to engage with the object through which the bolt passes to be secured thereby, and on the opposite side with the peripheral lugs C, adapted to be bent down against the nut D, also with the raised boss E, surrounding the bolt-hole F, adapted to support the nut on a plane higher than the base of the peripheral lugs.

The lugs B serve merely to prevent the washer from revolving upon the bolt G, and any well-known means heretofore employed for that purpose may be used. The peripheral lugs C serve to prevent the nut from turning backward to loosen on the bolt when turned onto the desired point. Many devices have heretofore been employed for this purpose. One edge of the washer has been turned up against one edge of the nut; but it is generally a difficult operation and requires special tools, and the bent portion was likely to break off while in use. Washers have been cast with an annular upturned flange or rim, the upper edge of which was designed to be bent in against the edge of the nut. Such a washer was found to be impracticable, principally because the flange could not be made sufficiently flexible to be bent in against the nut without extending it so high as to materially interfere with or wholly prevent the use of a wrench to turn on the nut.

I have ascertained that by forming the washer with a boss adapted to support the nut on a plane raised above the base of the flange I can largely overcome the difficulty, as I secure a longer and more flexible flange without proportionately inclosing or covering the nut to interfere with the convenient use of a wrench.

When desired, the flange may be employed in connection with the raised boss, as shown by dotted lines in Fig. 2; but I prefer a plurality of peripheral lugs or flange-segments adapted to be separately and successively bent inward against the nut, for the reason that they require less material and can be more easily operated, and they do not require to be projected so high above their base as the continuous flange to secure the same degree of flexibility.

I have also ascertained that by giving the lugs an outward inclination I can successfully cast their ends or points thicker than their body parts, thereby affording a thicker and more formidable stop at the point of contact of the lugs with the nut without any sacrifice of flexibility in the body part of the lugs.

The washers are preferably made of cast-iron, made malleable, and when the locking flange or lugs project straight out from the nut side of the washer without inclination thereto, as has been done heretofore, they must taper approximately to an edge or points, or the patterns could not be drawn from the molding-sand. These points or edge are bent over upon the boss against the lower edge of the nut to lock it, and if the bolt and parts held by it yield a little in use the nut might jump these small locking-points; but my improved thickened points wholly overcome this difficulty.

One lug will suffice to lock the nut when bent down just back of one corner of the nut, as shown by solid lines in Fig. 1 and by dotted lines in Fig. 2; but I prefer to provide a plurality of lugs, which afford ample means for adjusting the nut in different positions, and many times without substituting a new washer.

What I claim as new, and desire to secure by Letters Patent, is—

1. As an improved article of manufacture, a nut-locking washer made of a single piece of flexible metal, consisting of a plate provided with a central bolt-hole and means for preventing the washer from turning on the bolt, and having a peripheral lug projecting from the nut side of the washer, and on the same side a boss around the bolt-hole raised above the base of the lug, substantially as described.

2. A nut-locking washer composed of an integral malleable casting having a central bolt-hole and means for preventing the washer from turning on the bolt, and provided with a peripheral lug projecting from the nut side of the washer and having the end of the lug thicker than the body part and inclined outward from the center of the washer, substantially as described.

In testimony whereof I have hereunto set my hand this 30th day of April, 1888.

WILLIAM SLEICHER, JR.

Witnesses:
GEO. A. MOSHER,
W. H. HOLLISTER, Jr.